May 16, 1933.  F. G. THWAITS  1,909,733
HOSE REEL AND TANK TRUCK
Filed June 24, 1929   3 Sheets-Sheet 1

INVENTOR.
Frederick G. Thwaits
BY
Morsell, Keeney & Morsell
ATTORNEYS.

May 16, 1933.　　　　F. G. THWAITS　　　　1,909,733

HOSE REEL AND TANK TRUCK

Filed June 24, 1929　　　3 Sheets-Sheet 3

INVENTOR.
Frederick G. Thwaits
BY
Morsell, Keeney & Morsell
ATTORNEYS.

Patented May 16, 1933

1,909,733

UNITED STATES PATENT OFFICE

FREDERICK G. THWAITS, OF WAUWATOSA, WISCONSIN, ASSIGNOR TO THE HEIL CO., OF MILWAUKEE, WISCONSIN, A CORPORATION OF WISCONSIN

HOSE REEL AND TANK TRUCK

Application filed June 24, 1929. Serial No. 373,173.

This invention relates to improvements in hose reel and tank truck.

It is one of the objects of the present invention to provide a hose reel tank delivery truck having a number of compartments and valved pipes in the form of a manifold and a pump driven from the truck motor for discharging oil from any of the compartments into a connection with a hose carried on a reel journaled on the truck.

A further object of the invention is to provide a hose reel and tank truck in which the outer end of the hose has a valve to control the flow of the oil, and the piping is provided with a by-pass controlled by a relief valve in order to prevent damage to the equipment, in the event that the valve is closed while the pump is in operation.

A further object of the invention is to provide a hose reel and tank truck in which the piping to the different compartments is so arranged that in the event that the hose valve is closed while the pump is in operation that the oil will be by-passed from the pump outlet to the pump inlet without damage to the parts.

A further object of the invention is to provide a hose reel and tank truck having means for reversing the flow of the liquid in the pipes or ducts to permit use of the hose in withdrawing liquid from a tank at a lower level than the truck tank, back into the truck tank again.

A further object of the invention is to provide a hose reel and tank truck having means permitting the filling of the compartments by gravity through the pipes and ducts to the lower portions of the compartments.

A further object of the invention is to provide a hose reel and tank truck in which the parts are conveniently mounted on the truck for easy accessibility for discharging the contents of the compartments of the truck tank to points distant from the tank.

A further object of the invention is to provide a hose reel and tank truck which is of simple construction, is strong and durable and is well adapted for the purpose desired.

With the above and other objects in view the invention relates to the improved hose reel and tank truck and its parts and combinations as set forth in the claims, and all equivalents thereof.

In the accompanying drawings in which the same reference characters indicate the same parts in all of the views:

Fig. 5 is a fragmentary side view partly in section of the parts shown in Fig. 1, the view being on a larger scale;

Fig. 6 is a top detail view of hose and some of the piping;

Fig. 7 is a diagram showing the pump and connections involved in the improved fluid distributing system, and also showing the location of the various control valves.

Figure 1:
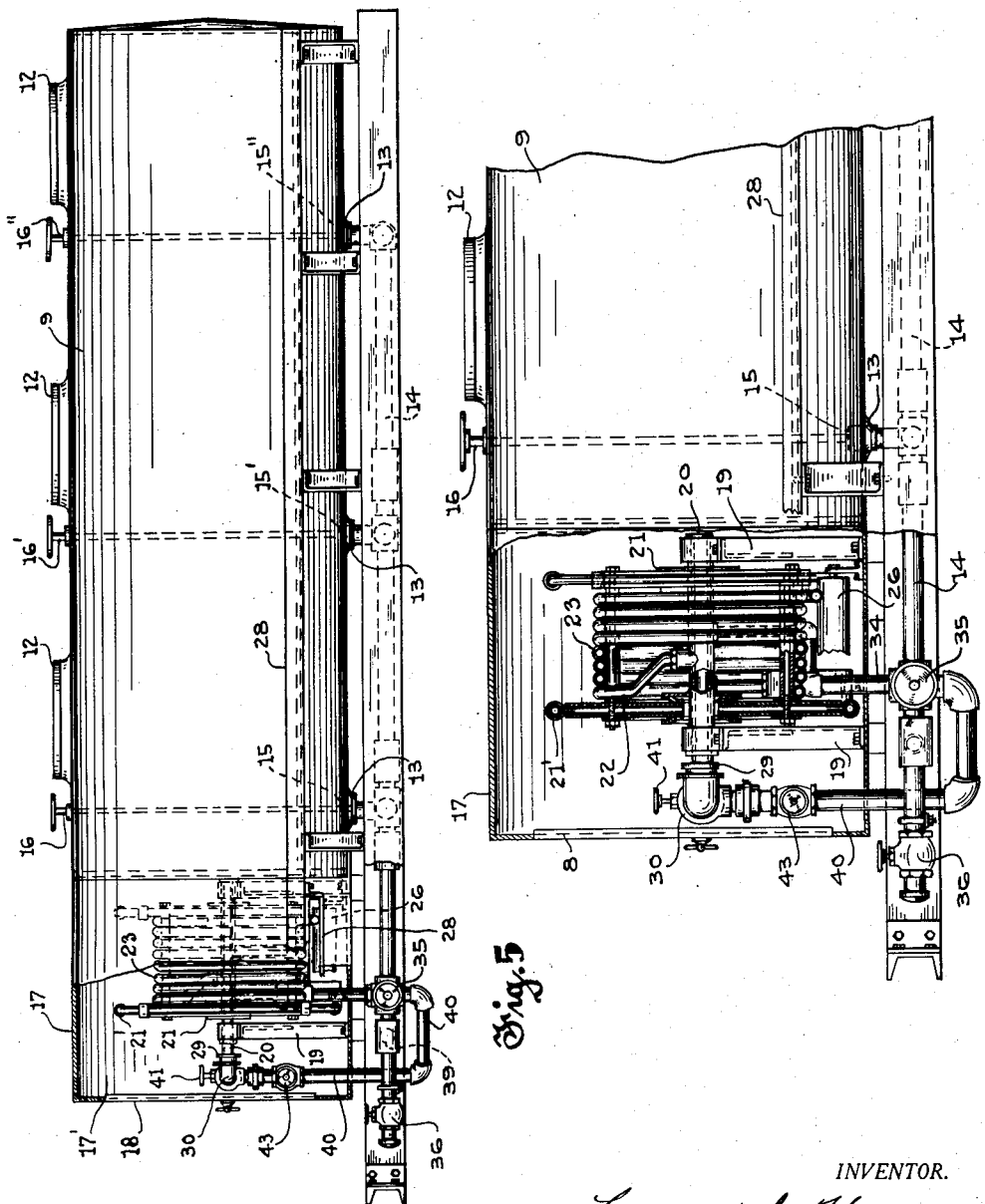
Fig. 1 is a side view of a truck tank provided with the hose reel and connections, parts broken away to show interior construction.
Figure 2:
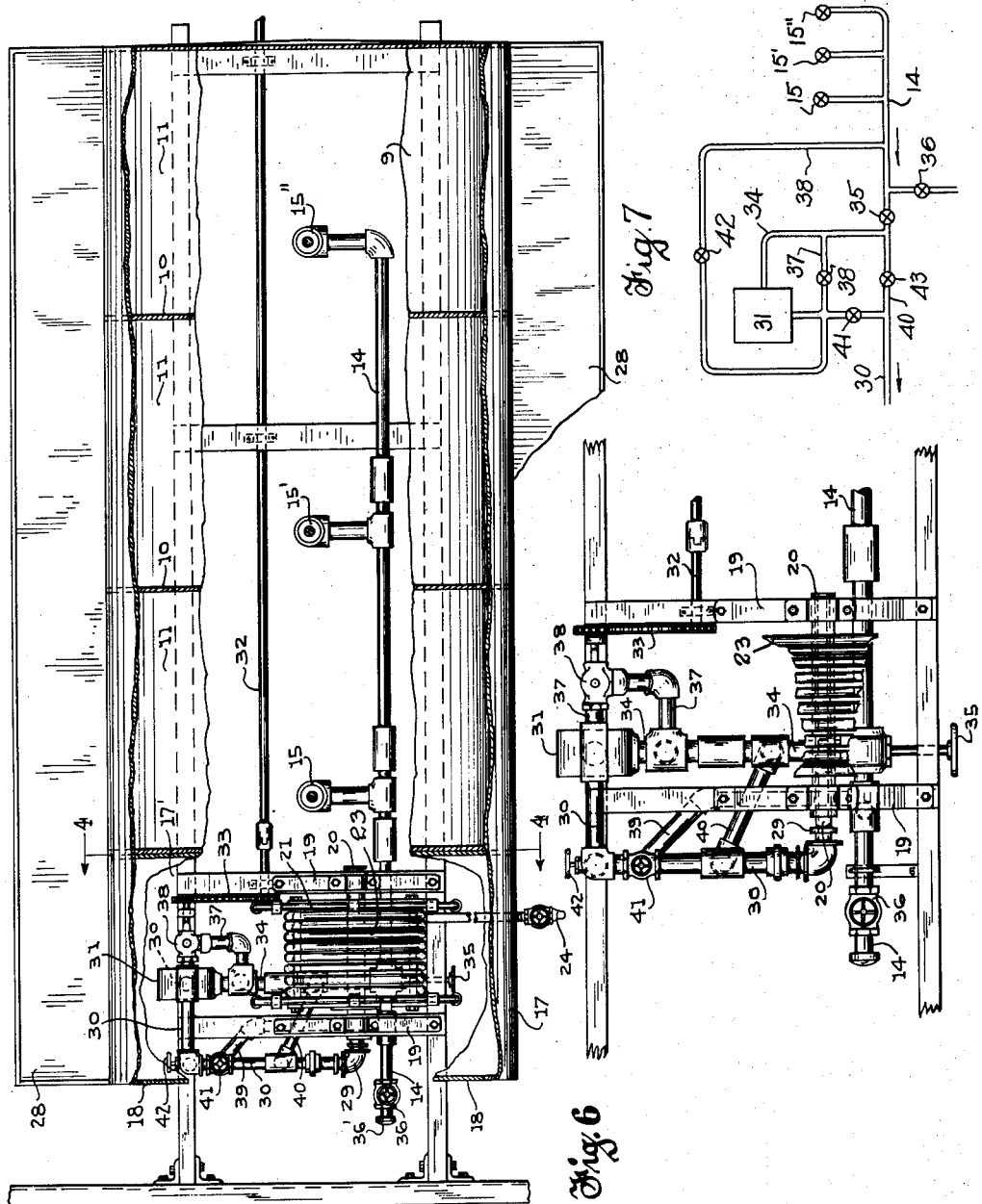
Fig. 2 is a top view thereof, parts broken away and other parts being in section to show interior construction.

Referring to the drawings the tank 9 is represented as being mounted upon a portion of the frame or chassis of a motor truck. The tank is of oval formation in cross section and is formed with a number of transverse partitions 10 to provide compartments 11 in the tank. The upper portion of the tank is provided with covered inlet openings 12 and lower discharge openings 13 which are all connected to a common pipe or manifold 14 through valves 15, 15' and 15''. Valve stems 16, 16' and 16'' extend from the valves upwardly through the compartments and at their upper ends are provided with suitable handles for turning the valves to open or closed position.

The rear end portion of the tank is provided with a rearward extension to form a closure or housing 17 which is closed at its rear end by hinged doors 18. The housing forms an enclosure for the hose reel and hose and other parts which will now be described.

A reel frame 19 mounted within the closure 17 has journaled thereon the tubular shaft 20 which forms part of and turns with a hose reel 21. The inner end of the tubular shaft 20 is closed and medially of its length is provided with a tubular connection 22 to which the inner end of the hose 23 is attached, the hose being wound around the reel as indicated. The outer end portion of the hose is provided with a valved nozzle 24 and extends outwardly through an elongated slot 25 formed in one side portion of the casing 17 for convenient extension to a point of use. A roller 26 supports the portion of the hose between the reel and the slot 25 and the hose is further supported by an elongated bracket 27 mounted beneath the adjacent run-board 28 mounted on opposite sides of the tank 9 so that in unreeling or winding up the hose on the reel the hose can freely move from one end of the elongated slot and bracket to the other.

The outer end of the reel shaft 20 is connected to and also journaled in a stuffing box fitting 29 forming part of a pipe or conduit 30 which extends and is connected to a pump 31 mounted in the compartment 17' formed by the casing or housing 17. The pump is connected to a shaft 32 by sprocket wheels and chain 33 and is driven thereby, and the shaft in turn is connected to the transmission of the truck. Pipes or ducts 34 forming the inlet to the pump connect the pump to the manifold pipe 14 so that when the pump is rotated and one of the tank compartment valves is opened the oil will be pumped from the compartment to and through the pump and the hose and to the point desired. A valve 35 provides for closing off the flow from the manifold pipe 14 to the pump inlet pipe 34 without closing the flow through the pipe 14, and a valve 36 on the outer end portion of the manifold pipe 14 provides for draining the pipes and tank compartments and for filling the tank compartments when the source of supply is on a higher level than the tank compartments. To prevent injury to the parts in the event that a careless operator should turn off the nozzle valve while the pump is still in operation, a by-pass conduit is provided which is controlled by a pressure relief valve. The by-pass conduit or pipes 37 extends from the pump inlet pipe 34 to the pump outlet pipe 30. A relief valve 38 intersects the by-pass conduit 37 and is adjustable to open at a predetermined pressure so that if any of the valves controlling the free flow of the liquid are closed and the pump is in operation, the pressure generated by the pump will open the relief valve and permit the liquid to flow through the by-pass duct from one side of the pump to the other and thus prevent injury to the parts.

Figure 3:
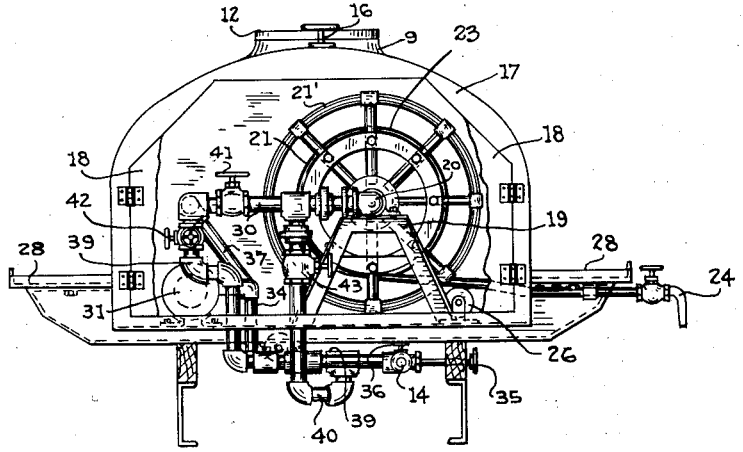
Fig. 3 is a rear end view, the compartment doors being broken away to show interior construction.
Figure 4:
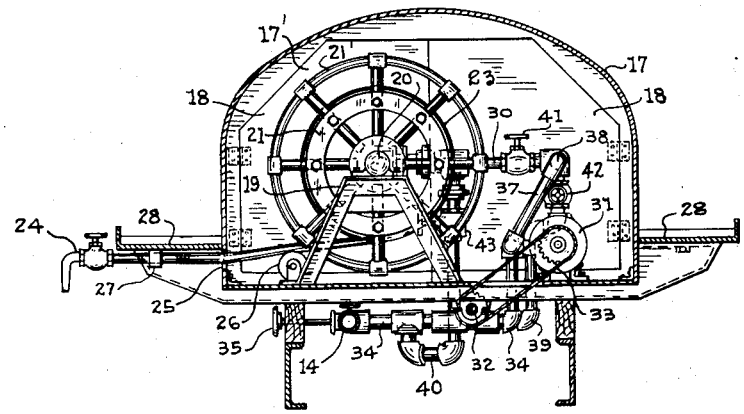
Fig. 4 is a transverse sectional view taken on line 4—4 of Fig. 2.

It sometimes happens that a mistake is made in delivering the wrong grade or quality of oil and it is necessary to remove the oil, or it may be desirable to remove oil from a tank and to accomplish this result, branch ducts or pipes 39 and 40 and valves 41, 42 and 43 are provided. The branch duct 39 is connected to and extends from the elbow of the pipe 30 to the manifold pipe 14 and the valve 42 controls the flow through said duct 39. The branch pipe or duct 40 is also connected to the pipe 30 and extends to the pump inlet pipe 34 between the by-pass duct and the manifold pipe 14. The flow through said pipe 40 is controlled by the valve 43. The valve 41 intersects the pipe 30 between the branch pipes 39 and 40 as clearly shown in Fig. 3.

A cap 36' closes the outer end of the pipe 14. The pipe construction 21' of the side portions of the hose reel provides for easily turning said reel to wind up the hose.

In operation and under normal conditions in filling a tank at a higher level than the tank compartments, the valves 36, 42 and 43 are closed and one of the compartment valves 15 and the other pipe valves are open. The pump is started and oil from the compartment will be drawn through the manifold pipe 14 and the pump inlet pipe 34 to the pump and the pump will force the oil through the pipes 30 and the tubular reel shaft to the hose and through the hose and nozzle to the tank being filled. If the hose valve is closed while the pump is in operation a pressure will be generated sufficiently high to open the relief valve 38 and the continued operation of the pump will then merely circulate the oil through the by-pass pipes 37 and back to the pump without doing any damage to the parts. If it is now desired to remove oil from a tank that has been filled by mistake and draw the oil back into the truck tank compartment, the valves 35 and 41 are closed and the valve of the compartment it is desired to refill and the valves 42 and 43 are opened. The outer end of the hose is inserted in the tank to be emptied and the pump is started. The oil will now be drawn through the hose and its tubular shaft 29 to the pipe 30 and from said pipe through the branch pipe 40 and the pump supply pipe 34 to the pump. From the pump the oil will be forced through the pipe 30 to the branch pipe 39 and through said pipe to the compartment.

In this use the by-pass duct and the relief valve will perform its function as before described.

In discharging any of the compartments by gravity the valve 35 is opened and the other valves are left in the same position last described and the pump is not operated. With the parts as thus described the oil will flow by gravity from the compartment opened through the manifold pipe 14 to the pump inlet pipe 34, branch pipe 40 and pipe 30 to the tubular reel shaft 29 and thence through the hose to the desired point of discharge.

If it is desired to fill the compartments from a source of supply located at a higher level or from a source of supply under pressure the valve 36 is opened and the cap 36' is removed from the end of the pipe 14 and the supply pipe is connected thereto. This last mentioned arrangement is also of value in permitting the use of the pump in forcing oil from a truck tank not provided with a pump and when so used the valves with the exception of valve 36, are arranged in the position first mentioned with respect to the normal discharge of the oil.

From the foregoing description it will be seen that the hose reel for tank trucks provides for varied uses in handling and discharging oil from truck tanks.

What I claim as my invention is:

1. In combination, a tank, a pump having inlet pipes and also having an outlet pipe, a branch pipe connecting said inlet and outlet pipes and having a valve therein, a second branch pipe connecting said inlet and outlet pipes and having a valve therein, a shut-off valve in said inlet pipes between the points of connection of said branch pipes thereto, and a shut-off valve in said outlet pipe between the points of connection of said branch pipes thereto.

2. In combination, a tank, a pump having inlet pipes and also having an outlet pipe, a branch pipe connecting said inlet and outlet pipes and having a valve therein, a second branch pipe connecting said inlet and outlet pipes and having a valve therein, a shut-off valve in said inlet pipes between the points of connection of said branch pipes thereto, a shut-off valve in said outlet pipe between the points of connection of said branch pipes thereto, and a valve controlled by-pass connecting said inlet and outlet pipes at points between said pump and the shut-off valves in said pipes.

3. In combination, a tank, a pump having inlet pipes and also having an outlet pipe, a branch pipe connecting said inlet and outlet pipes and having a valve tnerein, a shut-off valve in said inlet pipe between said pump and the point of connection of said branch pipe thereto, and a valve controlled by-pass connecting said outlet pipe with said inlet pipe between said pump and said shut-off valve.

4. In combination, a tank having several compartments, a pump having inlet pipes common to all of said compartments and also having an outlet pipe, said inlet pipes having independent valve controlled connections with said compartments, a branch pipe connecting said inlet and outlet pipes and having a valve therein, a second branch pipe connecting said inlet and outlet pipes and having a valve therein, a shut-off valve in said inlet pipes between the points of connection of said branch pipes thereto, and a shut-off valve in said outlet pipe between the points of connection of said branch pipes thereto.

5. In combination, a tank having several compartments, a pump having inlet pipes common to all of said compartments and also having an outlet pipe, said inlet pipes having independent valve controlled connections with said compartments, a branch pipe connecting said inlet and outlet pipes and having a valve therein, a second branch pipe connecting said inlet and outlet pipes and having a valve therein, a shut-off valve in said inlet pipes between the points of connection of said branch pipes thereto, a shut-off valve in said outlet pipe between the points of connection of said branch pipes thereto, and a valve controlled by-pass connecting said inlet and outlet pipes at points between said pump and the shut-off valves in said pipes.

6. In combination, a tank having several compartments, a pump having inlet pipes common to all of said compartments and also having an outlet pipe, said inlet pipes having independent valve controlled connections with said compartments, a branch pipe connecting said inlet and outlet pipes and having a valve therein, a shut-off valve in said inlet pipe between said pump and the point of connection of said branch pipe thereto, and a valve controlled by-pass connecting said outlet pipe with said inlet pipe between said pump and said shut-off valve.

In testimony whereof, I affix my signature.

FREDERICK G. THWAITS.